Sept. 24, 1929.  H. HELRICH  1,729,425
SAFETY DEVICE FOR GAS RANGES
Filed July 14, 1928
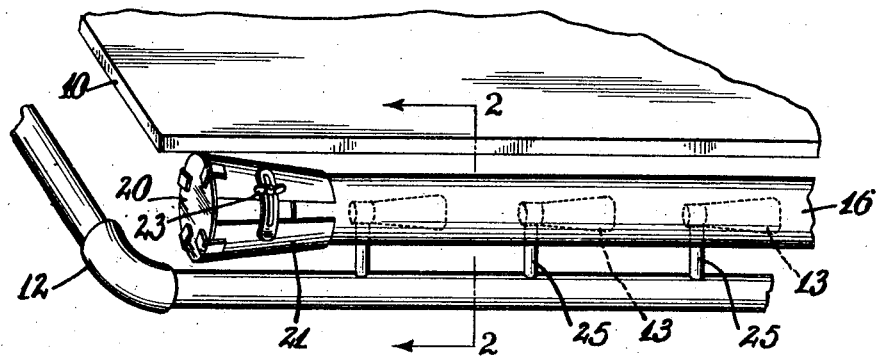
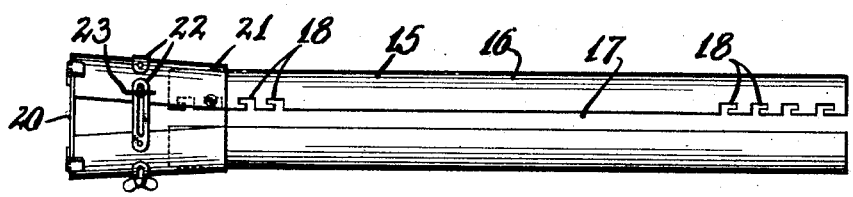
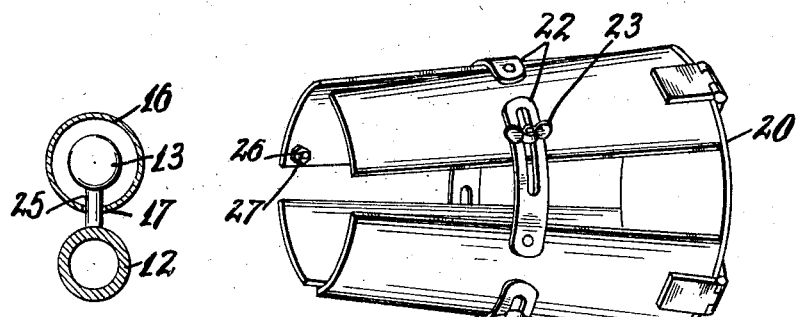
INVENTOR
Herman Helrich
BY
ATTORNEY Patented Sept. 24, 1929

1,729,425

UNITED STATES PATENT OFFICE

HERMAN HELRICH, OF NEW YORK, N. Y.

SAFETY DEVICE FOR GAS RANGES

Application filed July 14, 1928. Serial No. 292,875.

This invention relates generally to gas ranges and the like, and has more particular reference to a novel safety locking attachment therefor adapted for preventing asphyxiation of persons due to accidental opening of the gas jets.

The invention has for an object the provision of a device of the class mentioned which is of simple durable construction, desirable and efficient in action, and which can be manufactured and sold at a reasonable cost.

The invention proposes the use of a tubular member with a slot extending across its entire length, and with several bayonet slots connecting with the said slot. End caps are engageable on the ends of the tubular member and are provided with projecting bolts engaging with the bayonet slots for holding the cap in place. The tubular member is arranged for slipping over the gas jet valves on the gas supply pipe for preventing accidental opening of the valves. The longitudinal slot in the tubular member allows the stems of the valves to enter into the tubular member. The tubular member should be made of a flexible material so as to be engageable on different size valve stems, and the caps should be adjustable to accommodate different diameter sizes of the tubular member.

It is particularly pointed out that this device prevents children from unknowingly opening the gas valves, and also prevents cats, dogs, rats or the like from doing the same thing.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Fig. 1 is a fragmentary perspective view of a gas range provided with the safety locking attachment.

Fig. 2 is a vertical sectional view, taken on the line 2—2 of Fig. 1.

Fig. 3 is a side elevational view of the device with one end cap removed.

Fig. 4 is a perspective detail view of one of the end caps.

Fig. 5 is an end view thereof.

The reference numeral 10 indicates generally a gas range of any design or construction having a gas supply pipe 12 with valve handles 13 for controlling the supply of gas to the individual burners of the range 10. For preventing the accidental opening of the valve handles 13 when not in use they are enclosed within a safety attachment 15.

The attachment 15 consists of a tubular member 16 formed with a slot 17 extending its full length, and having at its ends a plurality of bayonet slots 18 communicating with the slot 17. An end cap 19 is removably engaged on each end of the tubular member. Each of these end caps consists of an end disc 20 with a plurality of side members 21 hingedly connected. Straps 22 pivotally connect with each of the side members, and project over the adjacent side members and are adjustably secured thereto by wing set screw 23 connected on the side members and one of the side members 21 is provided with a screw 26 and nut 27, the screw 26 projecting inwards.

In operation of the device, the tubular member 16 is first passed over the valve handles 13 so that the stems 25 of the valve handles 13 pass thru the slot 17. This tubular member is made of springly material so as to assume a diameter as determined by the size of the valve handles 13 as may be seen from Fig. 3. The wing set screws 23 are then loosened and the sides 21 adjusted so that the free ends snugly fit about the tubular member, then the screws are tightened.

The end caps 19 are next to move along on the tubular member so that the projecting screws 26 pass thru the slot 17, then the caps are turned for engaging the projecting screws 26 into the slots 18 and this holds the end caps in place in longitudinal adjusted position. With the device thus engaged on the valve handles, it is obvious that the valves 13 cannot be opened. The device must be removed for permitting the valves to be opened. It is pointed out that the plurality of the bayonet slots 18 adapts the device to pipes of slightly different lengths having valves arranged over different distances.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention what I claim as new and desire to secure by United States Letters Patent is:

1. A device of the class described, comprising a tubular member having a slot extending its full length and bayonet slots communicating with the said slot, a transverse disc, side members hingedly mounted on the said disc, straps pivotally mounted on each of the side members and projecting over adjacent side members, means for adjustably fastening the free ends of the straps onto the said side members under the said free ends, and a screw fixed on one of the side members to engage one of the said bayonet slots.

2. In a device of the class described, a transverse disc, side members hingedly mounted on the said disc, straps pivotally mounted on each of the side members and projecting over adjacent side members, means for adjustably fastening the free ends of the straps onto the said side members under the said free ends, and a screw fixed on one of the side members and extending inwards for engaging one of a plurality of bayonet slots formed in a tubular member having a slot extending its full length and communicating with the bayonet slots.

In testimony whereof I have affixed my signature.

HERMAN HELRICH.